United States Patent
De Gaetano et al.

(10) Patent No.: US 11,556,426 B2
(45) Date of Patent: Jan. 17, 2023

(54) TRIGGERING BACKUPS OF OBJECTS BASED ON RELEVANCE OF CATEGORIES OF CHANGES THEREOF

(71) Applicant: International Business Machines Corporation, Armonk, NY (US)

(72) Inventors: Rossella De Gaetano, Rome (IT); Davide Fazzone, Baiano (IT); Luigi Lombardi, Naples (IT); Simone Bonetti, Osio Sopra (IT)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 17/034,273

(22) Filed: Sep. 28, 2020

(65) Prior Publication Data
US 2022/0100610 A1 Mar. 31, 2022

(51) Int. Cl.
*G06F 16/00* (2019.01)
*G06F 11/14* (2006.01)
*G06N 20/00* (2019.01)

(52) U.S. Cl.
CPC ........ *G06F 11/1451* (2013.01); *G06F 16/00* (2019.01); *G06N 20/00* (2019.01); *G06F 2201/84* (2013.01)

(58) Field of Classification Search
CPC ... G06F 16/00; G06F 2201/84; G06F 11/1451
See application file for complete search history.

(56) References Cited

U.S. PATENT DOCUMENTS

| | | | |
|---|---|---|---|
| 7,461,221 B2 | 12/2008 | Palapudi | |
| 8,260,750 B1 | 9/2012 | Gugick | |
| 8,972,352 B1 | 3/2015 | Roche | |
| 10,061,657 B1 * | 8/2018 | Chopra | ............... G06F 11/1461 |
| 10,423,782 B2 | 9/2019 | Muttik | |
| 2008/0183773 A1 | 7/2008 | Choy | |
| 2017/0116220 A1 * | 4/2017 | Wong | ................... G06F 11/1458 |
| 2019/0132390 A1 | 5/2019 | Chakraborty | |
| 2019/0155695 A1 * | 5/2019 | Protasov | .................. G06N 3/08 |
| 2019/0332486 A1 | 10/2019 | Aseev | |
| 2020/0007620 A1 * | 1/2020 | Das | ........................ H04L 67/62 |
| 2020/0042400 A1 * | 2/2020 | Ashokkumar | ...... H04L 67/1095 |
| 2021/0263801 A1 * | 8/2021 | Reddy A V | ........... G06F 3/0685 |

FOREIGN PATENT DOCUMENTS

| | | |
|---|---|---|
| CN | 103154901 B | 3/2016 |
| KR | 101635243 B1 | 6/2016 |
| WO | 1999063441 A1 | 12/1999 |

OTHER PUBLICATIONS

"Patents Act 1977: Search Report under Section 17", Application No. GB2113210.5, dated Apr. 29, 2022, 4 pages.

* cited by examiner

*Primary Examiner* — Richard L Bowen
(74) *Attorney, Agent, or Firm* — Stephen R. Yoder (57) ABSTRACT

A solution is proposed for controlling backups of objects in an information technology system. A corresponding method comprises determining change categories of changes of the objects being changed since a previous backup thereof; backups of the changed objects are triggered according to corresponding trigger indicators based on change categories of their changes and on relevance weights thereof.

20 Claims, 8 Drawing Sheets

TRIGGERING BACKUPS OF OBJECTS BASED ON RELEVANCE OF CATEGORIES OF CHANGES THEREOF

BACKGROUND

The present disclosure relates to the information technology field. More specifically, this disclosure relates to backups of information technology systems. Information technology systems generally store a high amount of data, including data that are quite critical (for example, because relating to business/production activities, to offered services and so on). The data stored in the information technology systems may be lost (permanently) for a number of reasons. For example, this data loss may be due to failures (such as hardware crashes, data corruptions, software bugs, supplier dissolutions), disasters (such as fires, natural events), accidental actions (such as deletions, errors) or criminal attacks (such as thefts, harmful codes). The data loss may cause serious consequences when the data may not be restored (for example, in case of transactions, passwords). In any case, the data loss causes relatively highs costs (for example, due to temporary unavailability of services based on them, to time spent for recreating the data).

Therefore, backups of the data are regularly performed to avoid, or at least limit, the risks of their loss. Generally, a backup is a copy of the data that may be used to recover their original version in case of loss thereof; for safety reasons, the backups are preferably stored in locations different from the one of the original data (so as to be available even in case of disruption thereof).

Generally, the backups are performed periodically (such as every night) or in response to a manual request (such as after a massive update of the data). The backups may be of different types. For example, full backups relate to a complete copy of the data; the full backups are easy to restore, but they are time consuming and occupy large storage space. Incremental backups only relate to changes with respect to a previous backup (typically, between consecutive full backups at lower frequency); the incremental backups are faster and occupy a smaller storage space than other types of backups; however, corresponding restores are time consuming since they require starting from a last full backup and then applying all the following incremental backups. Differential backups only relate to changes with respect to a previous full backup; the incremental backups are faster and occupy less storage space than the full backups and their restores are faster than with the incremental backups; however, the restores with the differential backups are slower than with the full backups and the differential backups occupy more storage space than the incremental backups.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of triggering the backups according to a relevance of the changes.

Particularly, an exemplary embodiment provides a method for controlling backups of objects in an information technology system. The method includes operations such as determining change categories of changes of the objects being changed since a previous backup thereof. Additionally, in this method, backups of the changed objects are triggered according to corresponding trigger indicators based on change categories of their changes and on relevance weights thereof.

According to an aspect of the present invention, there is a method, computer program product and/or system that performs the following operations (not necessarily in the following order): detecting, by a computing system, one or more changed objects of the objects being changed since a previous backup thereof; determining, by the computing system, corresponding changes of the changed objects; determining, by the computing system, corresponding change categories of the changes; calculating, by the computing system, corresponding trigger indicators of the changed objects each according to the change categories of the changes of the changed object and to relevance weights of the change categories, the relevance weights being indicative of a relevance of the corresponding change categories; selecting, by the computing system, one or more critical objects of the changed objects according to the trigger indicators thereof; and triggering, by the computing system, corresponding backups of the critical objects.]

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

DETAILED DESCRIPTION

With reference in particular FIG. 1A-FIG. 1D, the general principles are shown of the solution according to an embodiment of the present disclosure.

Figure 1A:
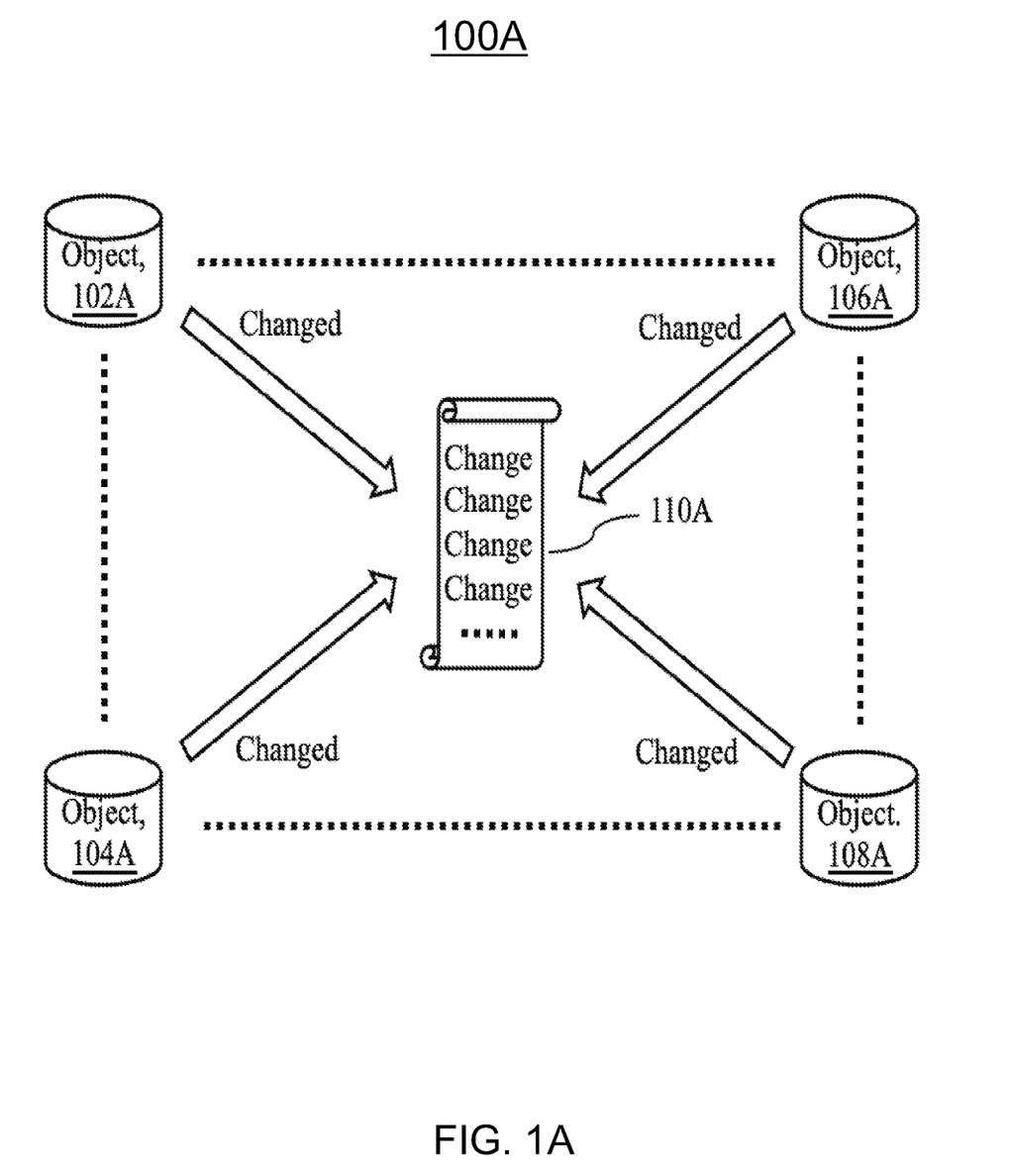
FIG. 1A, FIG. 1B, FIG. 1C and FIG. 1D show the general principles of the solution according to an embodiment of the present invention.

Starting from FIG. 1A, an information technology system 100A comprises several objects that are to be backed-up to limit the risk of their loss; the objects are (software) artifacts that store data, such as files, databases, programs, and so on. The objects that are changed (since a previous backup thereof) are detected; for each of these changed objects, one or more (object) changes thereof are determined. FIG. 1A includes the following: object 102A, object 104A, object 106A, object 108A and change list 110A.

Figure 1B:
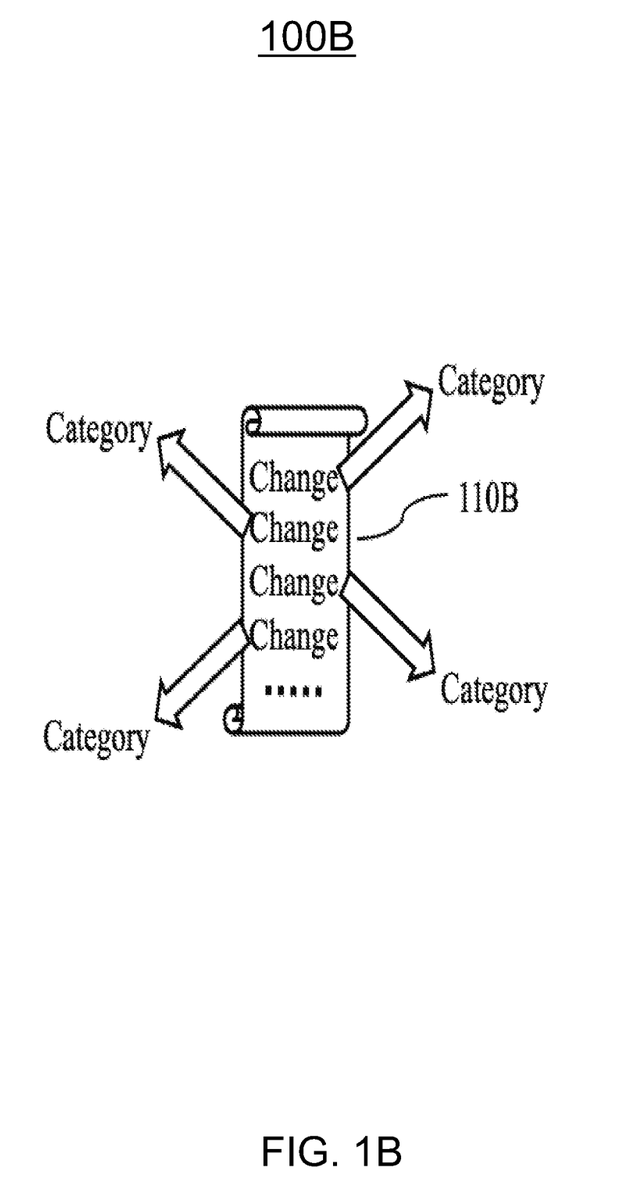

Moving to FIG. 1B, a (change) category of each change is determined (as shown by change list 110B in environment 100B); each change category groups together changes having similar properties. For example, the change categories may relate to contents (such as texts of documents, values/formulas of spreadsheets, fields of databases), comments (such as of sentences/cells), operative parameters (such as of applications, systems, networks) and so on.

Figure 1C:
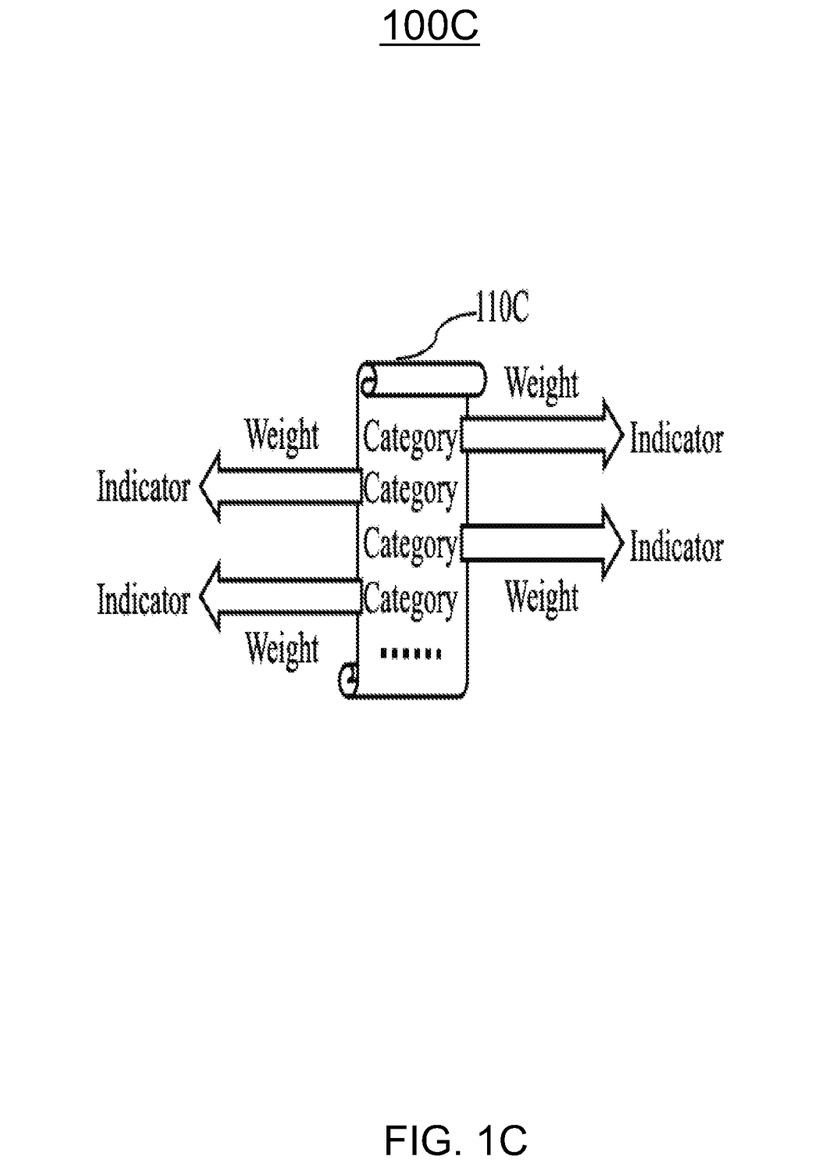

Moving to FIG. 1C, a trigger indicator is calculated for each changed object according to the change categories of its changes (as shown by change list 110C in environment 100C) and to relevance weights of the change categories (such as according to a weighted sum thereof). The relevance weight of each change category is indicative of a relevance of the change category (such as for the information technology system); for example, the relevance weight is high for key operative parameters and low for comments.

Figure 1D:
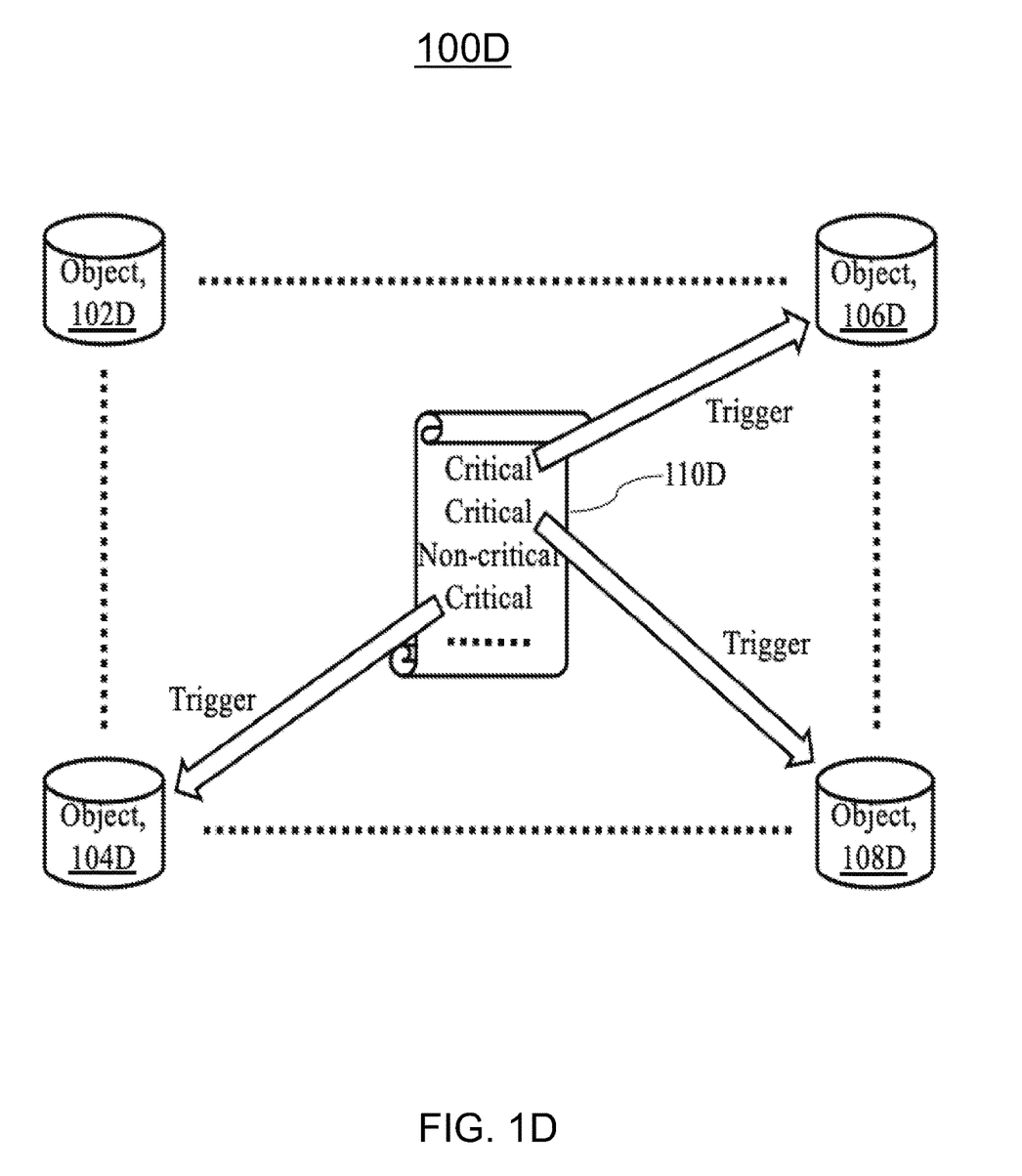

Moving to FIG. 1D, possible critical objects are selected among the changed objects according to the corresponding trigger indicators. For example, the critical objects are the ones whose changes belong to change categories of high relevance (such as key operative parameters). Backups of the critical objects are then triggered. Conversely, no action is performed for the other changed objects, for example, the ones whose changes belong to change categories of low relevance (such as comments). FIG. 1D includes the following: object 102D, object 104D, object 106D, object 108D and change list 110D.

The above-mentioned solution adds a semantic functionality to the control of the backups. Indeed, the backups are now triggered according to the nature of the changes of the objects (and not merely according to the amount of the changes and/or to the type of the objects, even if they may further be taken into account for this purpose).

In this way, the backups may be performed when they are actually useful. This makes the control of the backups more effective. For example, it is now possible to discriminate changes that are actually relevant (and then to be backup-up as soon as possible) from other changes that are substantially irrelevant (and then may be backed-up later on). For example, when an object is affected by the change of even a single key operative parameter, its backup is triggered promptly; conversely, when an object (even if of relevant type) is affected by the change of comments (even if in high number), its backup may be postponed.

As a result, it is possible to save time and storage space for data that are of relatively low importance and at the same time reduce the risk of loss of data that are highly valuable.

Figure 2:
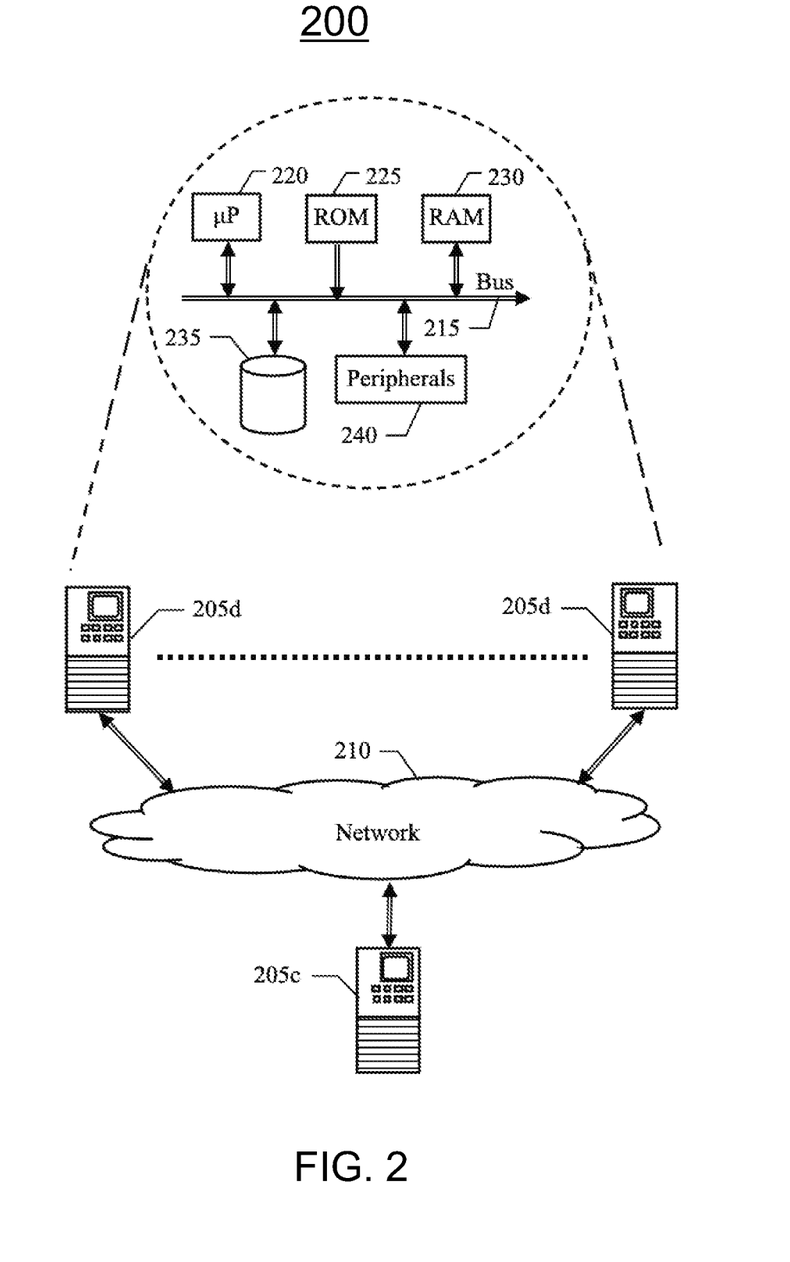
FIG. 2 shows a schematic block diagram of an information technology system according to an embodiment of the present invention.

With reference now to FIG. 2, a schematic block diagram is shown of an information technology system 200 wherein the solution according to an embodiment of the present disclosure may be practiced.

The information technology system 200 comprises several server computing machines, or simply servers, 205d, 205c that communicate among them over a (telecommunication) network 210 (for example, based on the Internet). The servers 205d and 205c comprise one or more data servers 205d and a control server 205c (or more). Each of the data servers 205d stores one or more of the objects to be backed-up, which objects are used to implement a service provided by the data server 205d (for example, WAS, DBRM, SaaS and so on). The control server 205c controls the backup of the objects stored in the data servers 205d.

Each of the above-described servers 205d and 205c comprises several units that are connected among them through a bus structure 215 with one or more levels. Particularly, one or more microprocessors (μP) 220 provides the logical capabilities of server 205d,205c; a non-volatile memory (ROM) 225 stores basic code for a bootstrap of the server 205d,205c and a volatile memory (RAM) 230 is used as a working memory by the microprocessors 220. The server 205d,205c is provided with a mass-memory 235 for storing programs and data (for example, storage devices of a data center wherein the server 205d,205c is implemented). Moreover, the server 205d,205c comprises a number of controllers for peripherals, or Input/Output (I/O) units 240; for example, the peripherals 240 comprise a network adapter for plugging the server 205d,205c into the data center and then connecting it to a console of the data center for its control (for example, a personal computer, also provided with a drive for reading/writing removable storage units, such as USB keys) and to a switch/router sub-system of the data center for its communication with the network 210.

Figure 3:
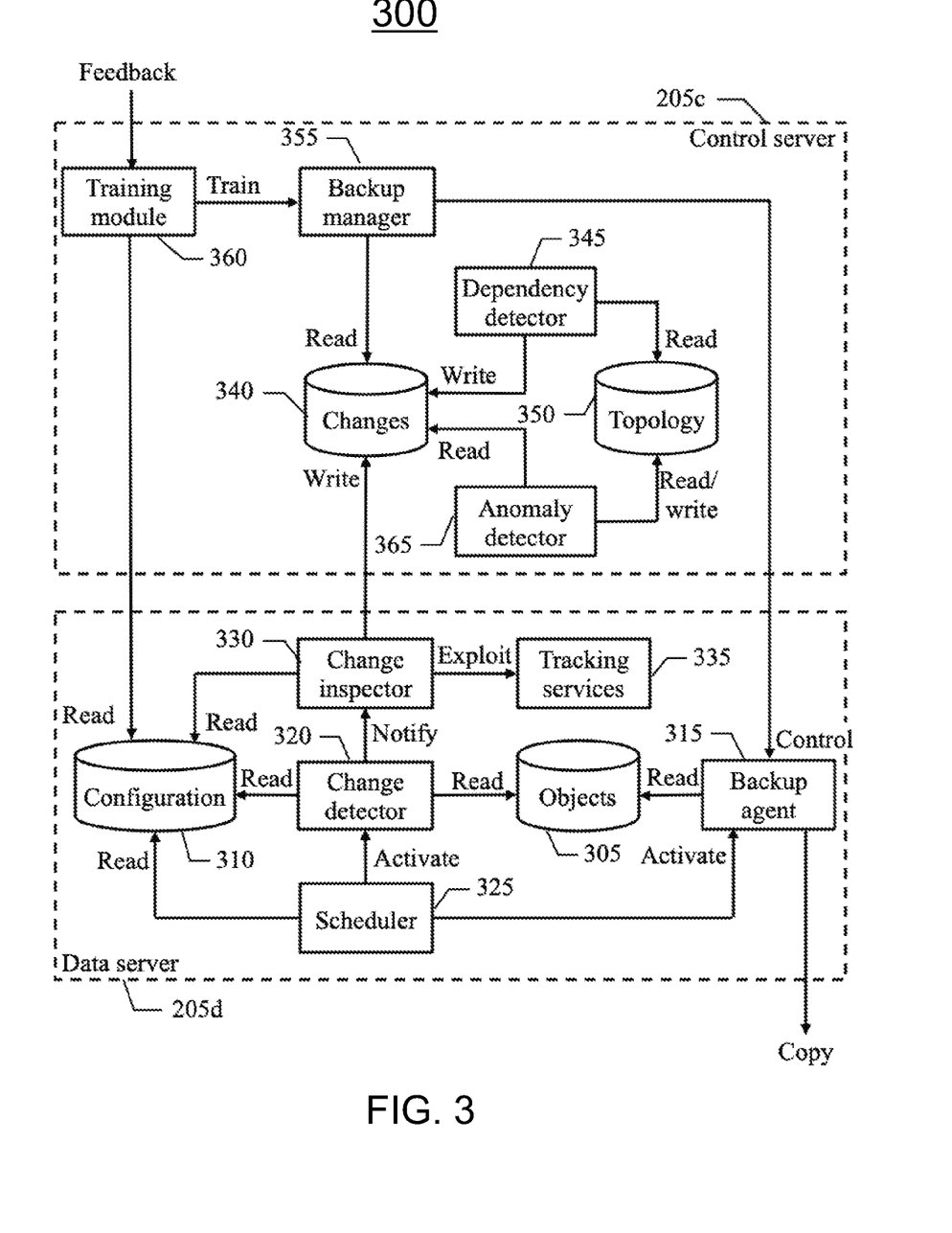
FIG. 3 shows the main software components that may be used to implement the solution according to an embodiment of the present invention.

With reference now to FIG. 3, the main software components are that may be used to implement the solution according to an embodiment of the present disclosure.

Particularly, all the software components (programs and data) are denoted as a whole with the reference 300. The software components 300 are typically stored in the mass memory and loaded (at least in part) into the working memories of the servers 250d,205c when the programs are running. The programs are installed into the mass memory, for example, by reading from removable storage units and/or downloading from the network. In this respect, each program may be a module, segment or portion of code, which comprises one or more executable instructions for implementing the specified logical function.

Starting from each data server 205d (only one shown in the figure), it comprises the following components. The data server 205d stores the corresponding objects to be backed-up, denoted with the reference 305 (for example, configuration files for a WAS, databases for a DBRM, documents for a SaaS and so on). A configuration repository 310 defines configuration information for the backup of the objects 305. Particularly, the configuration repository 310 lists the objects 305 to be backed-up by corresponding identifiers (for example, absolute paths of their files). The configuration repository 310 stores a control period for controlling the backup according to the trigger indicators, and a mandatory period for performing the backup indiscriminately (for example, to comply with audit requirements); the mandatory period is strictly higher than the control period (for example, equal to 10-50 times thereof). In this way, the control of the backup may be executed with a high frequency (such as every 1-24 hours) so as to back-up the critical objects (fast process) as soon as possible, with all the objects that are backed-up (slow process) in any case with a low frequency (such as every 1-7 days). The configuration repository 310 stores inspection instructions for the objects 305; for each (object) type of the objects 305 (indicated by a corresponding identifier, for example, its file extension for configuration files, databases, documents, spreadsheets and so on), the inspection instructions specify how to determine (object) changes belonging to one or more change categories (for example, parameters, permissions and comments for configuration files, fields, tables, permissions and comments for databases, texts, permissions and comments for documents, cells, permissions and comments for spreadsheets and so on).

The configuration repository 310 stores corresponding relevance weights for (trigger) parameters used to calculate the trigger indicators for the objects 305. Particularly, the trigger parameters comprise all the possible change categories of the objects 305; moreover, the trigger parameters may also comprise an (elapsed) time from a previous backup of each of the objects 305, one or more subjects defined by users of the data server 205*d* (indicated by corresponding identifiers, such as their userIDs) that may change the objects 305, all the possible object types of the objects 305 and a (change) frequency of the changes of each of the objects 305.

A backup agent 315 runs the backups of the objects 305. The backup agent 315 accesses (in read mode) the objects 305 and it copies them into a backup repository, which is stored in another server at a remote location (not shown in the figure). A change detector 320 detects the objects 305 that have changed since a previous backup thereof. The change detector 320 accesses (in read mode) the objects 305 and the configuration repository 310. A scheduler 325 activates the change detector 320 (according to the control period) and the backup agent 315 (according to the mandatory period). The scheduler 325 accesses (in read mode) the configuration repository 310. A change inspector 330 determines the changes of the objects 305. The change inspector 330 accesses (in read mode) the configuration repository 310 and it exploits one or more tracking services 335. The tracking services 335 track the changes of one or more change categories. The tracking services 335 may be either local (as shown in the figure) or remote, such as running on the control server 205*c* (not shown in the figure); for example, the tracking services 335 comprise a Version Control Service (VCS), like RCS, for determining changes in the content of documents/spreadsheets (such as parameters, comments, texts and cells), a pattern matching engine for determining changes in objects of binary type via system/application logs or audit files (such as permissions, fields and tables).

Moving to the control server 205*c*, it comprises the following components. A change repository 340 indicates the changes that have been determined in the data servers 205*c*. For example, the change repository comprises an entry for each changed object; the entry stores the identifier of the changed object, its object type, the change category of the corresponding change, an identifier of the data server 205*d* wherein the changed object is stored (for example, its network address), the identifier of the (changing) subject who changed it, the identifiers (data servers 205*d* and objects) of possible (impacted) objects that are impacted by the change, a (backup) result, i.e., successful or failed, and a (backup) time of a possible backup of the changed object. The change repository 340 is accessed (in write mode) by the change inspector 330 of every data server 205*c*.

A dependency detector 345, like IBM Tivoli Application Dependency Discovery Manager (TADDM) by IBM Corporation (trademarks thereof), detects the impacted objects of every changed object of the information technology system, either in the same or in different data servers. The dependency detector 345 accesses (in read/write mode) a system topology repository 350, which stores a system topology of the information technology system defined by correlations among the objects thereof (for example, defined by clusters, dependencies and so on). A backup manager 355 manages the control of the backups of the data servers 205*d*. For example, the backup manager 355 is implemented by a neural network based on a linear regression model.

A neural network is a data processing component that approximates operation of human brain. The neural network comprises basic processing elements (neurons), which perform operations defined by activation functions based on corresponding weights; the neurons are connected via unidirectional channels (synapses), which transfer information among them. The neurons are organized in layers performing different operations, always comprising an input layer and an output layer for receiving input information and for providing output information, respectively. In the linear regression model, the neural network has only two layers (i.e., the input layer and the output layer without any deep layer between them) and the activation functions are linear. The backup manager 355 accesses (in read mode) the change repository 340, and it controls the backup agent 315 of every data server 205*d*. A training module 360 trains the neural network of the backup manager 355 with a supervised learning technique. The training of a neural network is the process of finding (optimized) values of its weights that optimize the performance of the neural network. In a supervised learning technique, the training is based on a training set of input information and corresponding output information, which has been determined manually to be correct. The training module 360 accesses (in read mode) the configuration repository 310 of every data server 205*d* and it receives corresponding feedback indicators of the backups entered by an operator; each feedback indicator provides an indications of a utility of the corresponding backup. An anomaly detector 365 detects possible anomalies of the changes of the changed objects with respect to the system topology of the information technology system. The anomaly detector 365 accesses (in read mode) the change repository 340 and the system topology repository 350.

Figure 4A:
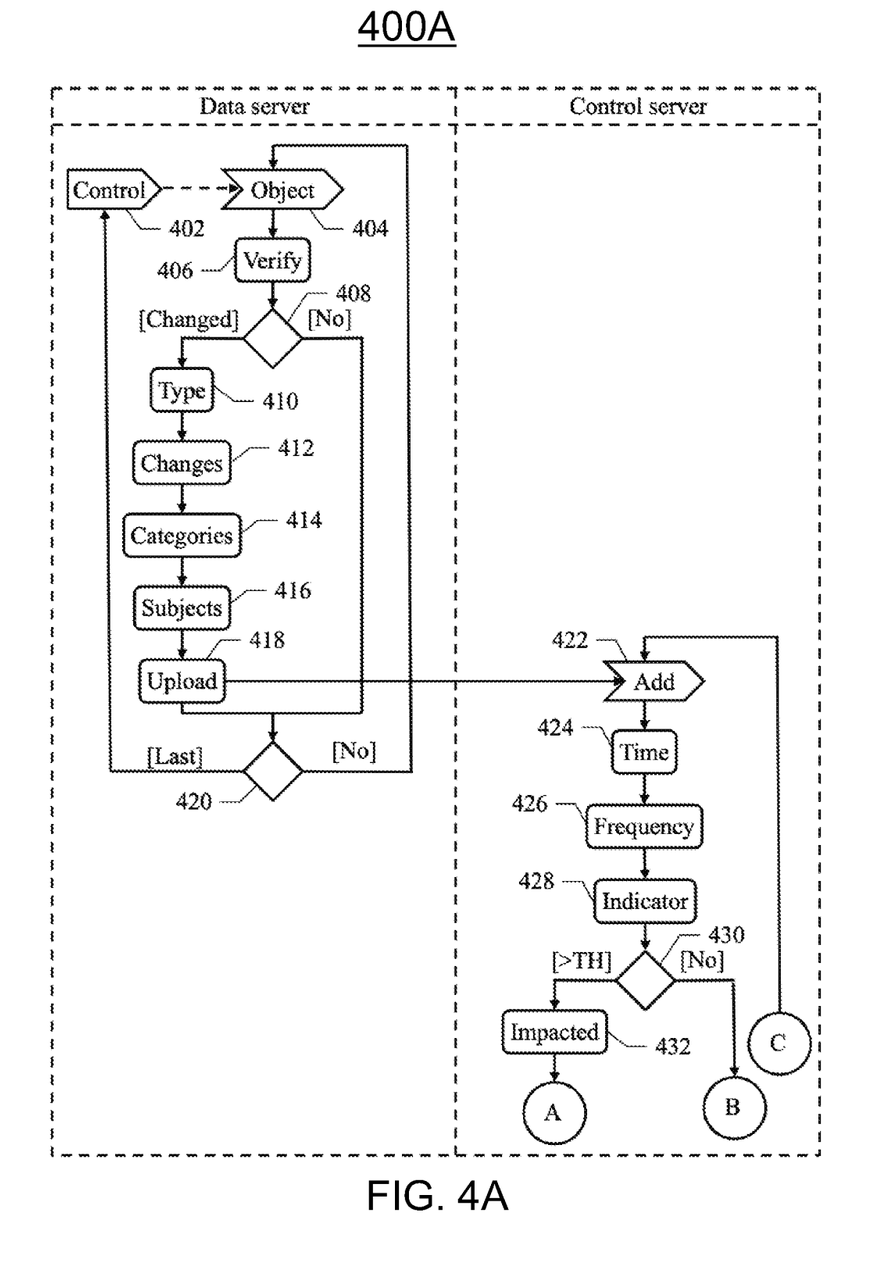
FIG. 4A and FIG. 4B show an activity diagram describing the flow of activities according to an embodiment of the present invention.
Figure 4B:
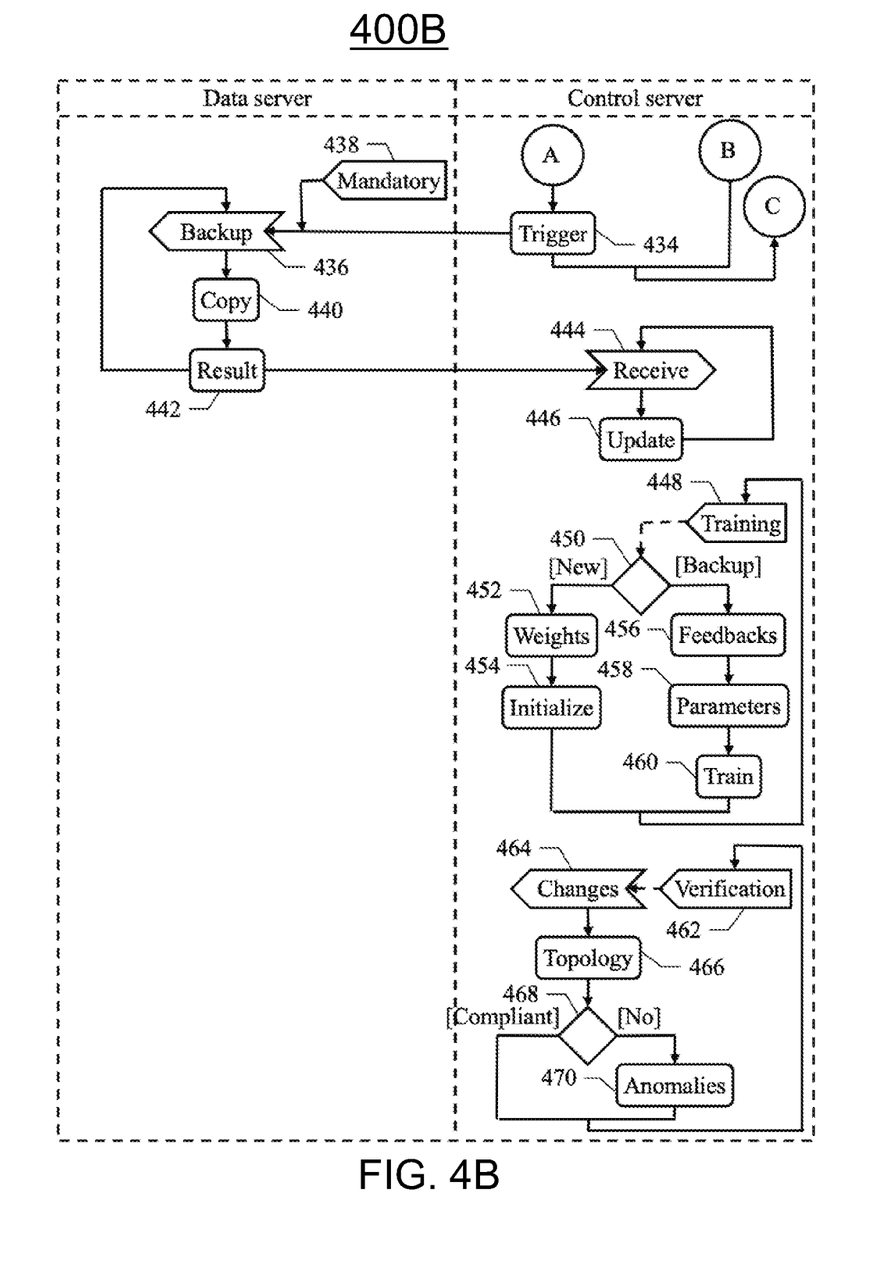

With reference now to FIG. 4A-FIG. 4B, an activity diagram is shown describing the flow of activities relating to an implementation of the solution according to an embodiment of the present disclosure.

Particularly, the activity diagram represents an exemplary process that may be used to control the backups in the information technology system with a method 400. In this respect, each block may correspond to one or more executable instructions for implementing the specified logical function on each workstation.

Starting from the swim-lane of a generic data server, the process passes from block 402 to block 404 whenever the scheduler detects that the control period has expired (from a previous control of the backups). In response thereto, a loop is entered with the change detector that takes a (current) object listed in the configuration repository into account (starting from a first one in any arbitrary order). The change detector at block 406 verifies whether the object has been changed since its last backup. For this purpose, for example, the change detector is registered to a corresponding API of an operating system of the data server, so as to receive a notification whenever every object is modified; in response thereto, the change detector asserts a corresponding change flag (deasserted whenever the object is backed-up). The flow of activity branches at block 408 according to a result of this verification. If the object has been changed (change flag being asserted), the change inspector at block 410 determines the object type of the changed object (according to its file extension). The change inspector at block 412 determines any changes of the changed object (via the inspection instructions corresponding to its object type). Accordingly, the change inspector at block 414 determines the change categories of the changes (in response to their detection by the corresponding tracking services). The change inspector at block 416 determines the subjects who have changed the changed object (for example, from metadata thereof). The change inspector at block 418 uploads the information so determined (i.e., object type, change categories and subjects) for the changed object (indicated by its identifier) to the control server, together with the identifier of the data server. The process then continues to block 420; the same point is also reached directly from the block 408 if the object has not been changed (change flag being deasserted). At this point, the change detector verifies whether a last object has been processed. If not, the process returns to the block 404 to repeat the same operations on a next object. Conversely, once all the objects have been processed, the loop is exit by returning to the block 402 waiting for the expiration of a next control period.

Moving to the swim-lane of the control server, the information relating to any changed object being uploaded by the corresponding data server (at the block 418 in this case) is added to the change repository at block 422 (into a corresponding (new) entry thereof). The backup manager at block 424 determines the time elapsed from a previous backup of the same changed object (equal to a difference between a current time and the backup time of the most recent entry with the same identifier of the changed object in the change repository). The backup manager at block 426 determines the change frequency of the changed object (equal to an average of the differences between the backup times of each pair of consecutive entries with the identifier of the changed object in the change repository). The backup manager at block 428 determines the input information for its neural network according to trigger parameters of the changed object. Particularly, the trigger parameters comprise the change category, the elapsed time, the subjects, the object type and the change frequency of the changed object. The input information instead comprises corresponding (category) flags for the change categories (asserted for the change categories of the changed object and deasserted otherwise), the elapsed time, corresponding (subject) flags for the subjects (asserted for the subjects of the changed object and deasserted otherwise), corresponding (type) flags for the object types (asserted for the object type of the changed object and deasserted otherwise) and the change frequency. The change manager then applies the input information to the neural network, which provides the corresponding output information comprising the trigger indicator of the changed object (for example, ranging from 0 to 1 in increasing order of utility of the backup of the changed object).

The flow of activity branches at block 430 according to the trigger indicator. If the trigger indicator is (possibly strictly) higher than a trigger threshold (for example, 0.6-0.8), this means that the backup of the changed object is likely to be quite useful. Therefore, the dependency detector at block 432 determines the possible (impacted) objects that might be impacted by the change of the changed object (directly or indirectly), and it updates the change repository accordingly; for this purpose, the dependency detector determines (according to the system topology in the corresponding repository) the impacted objects being correlated with the changed object, the (further) impacted objects being correlated with these impacted objects and so on, until no further impacted objects are determined. The backup manager at block 434 triggers the backup of the changed object and of its impacted objects on the corresponding data servers, either the same as or different to each other (as indicated in the change repository). In this way, it is possible to back-up a consistent configuration of the information technology system (given by the changed object and its impacted objects); for example, in case of a change to a WAS application, the WAS application is backed-up together with a corresponding database. The process then returns to the block 422 from the block 434 or directly from the block 430 (if the trigger indicator is (possibly strictly) lower than the trigger threshold meaning that the backup of the changed object is likely to be quite useless) waiting for the upload of the information relating to a next changed object.

Moving to the swim-lane of each data server wherein the backup has been triggered by the control server at the block 434 (the same one as above in the figure), the backup agent is activated accordingly at block 436 for the changed/impacted objects stored in the data server. The same point is also reached from the block 438, whenever the scheduler detects that the mandatory period has expired from a previous (full) backup of the data server; in this case, the backup agent is activated for all the objects of the data server listed in the configuration repository. In both cases, the backup agent at block 440 copies the objects to be backed-up to the backup repository. The backup agent at block 442 returns a (backup) result of the backup to the control server (successful or failed for the corresponding objects). The process then returns to the block 436 waiting for a next activation of the backup agent.

With reference again to the control server, the backup manager at block 444 receives the backup result from any data server (from the block 442 in the example at issue). In response thereto, the control manager at block 446 updates the corresponding entry of the change repository accordingly (by adding the result of the backup and its backup time set to the current time). The process then returns to the block 444 waiting for a next backup result.

In a completely independent way, the process passes from block 448 to block 450 whenever a (training) event occurs triggering the training of the neural network of the backup manager by the training module; for example, this happens in response to the addition of a (new) data server to the information technology system (notified manually by the operator) or to the running of a (previous) backup (notified by the backup manager). The flow of activity then branches according to the training event. Particularly, in case of a new data server the blocks 452-454 are executed, whereas in case of a previous backup the blocks 456-460 are executed; in both cases, the process then returns to the block 448 waiting for a next training event. With reference in particular to block 452 (new data server), the training module retrieves the relevance weights from the configuration repository of the new data server (wherein they have been set manually by the operator or automatically to random values). The training module at block 454 initializes the neural network accordingly. In the specific example at issue (neural network based on linear regression model), the neural network has the input layer comprising corresponding neurons for the trigger parameters (change categories, elapsed time, subjects, object type and change frequency) of all the data servers and the output layer with a single neuron for the trigger indicator. The activation function of each neuron of the input layer multiplies the piece of input information corresponding to its trigger parameter by the relevance weight thereof, and the activation function of the neuron of the output layer sums the results provided by all the neurons of the input layer. Therefore, the trigger indicator is calculated as a (weighted) sum corresponding to the trigger parameters:

$$TI = \sum_{i=1}^{Ncc}(Wcc_i \cdot Fcc_i) + Wet \cdot te + \sum_{i=1}^{Nu}(Wu_i \cdot Fu_i) + \sum_{i=1}^{Not}(Wot_i \cdot Fot_i) + Wcf \cdot fc$$

wherein TI is the trigger indicator (for example, further normalized to range from 0 to 1), Ncc is the number of change categories, $Wcc_i$ is the relevance weight of the i-th change category, $Fcc_i$ is the category flag of the i-th change category (1 when asserted and 0 when deasserted), Wet is the relevance weight of the elapsed time, to is the elapsed time, Nu is the number of subjects, $Wu_i$ is the relevance weight of the i-th subject, $Fu_i$ is the subject flag of i-th subject (1 when asserted and 0 when deasserted), Not is the number of object types, $Wot_i$ is the relevance weight of the i-th object type, $Fot_i$ is the type flag of i-th object type (1 when asserted and 0 when deasserted), Wcf is the relevance weight of the change frequency and fc is the change frequency. With reference now to the block 456 (previous backup), the training module prompts the operator to enter the corresponding feedback indicator (according to its utility); for example, the feedback indicator ranges from 0 (previous backup deemed totally useless) to 1 (previous backup deemed totally useful). The training module at block 458 retrieves the trigger parameters that have been used to calculate the trigger indicator of the previous backup (from the change repository). The training module at block 460 trains the neural network (for the object of the backup) according to the trigger parameters and the feedback indicator. For example, the training is an iterative process based on the Stochastic Gradient Descent (SGD) algorithm. In this case, the training module determines a change of the relevance weights that should reduce a difference between the trigger indicator (provided by the neural network in response to the input information corresponding to the trigger parameters) and the feedback indicator (deemed to be its correct value); the direction and the amount of the change is given by a gradient of an error function with respect to the relevance weights, which is approximated with a backpropagation algorithm. The same operations are repeated until an acceptable difference (between the trigger indicator and the feedback indicator) is obtained or the change of the relevance weights do not provide any significant improvement (meaning that a minimum, at least local, or a flat region of the error function has been found). The relevance weights are changed with the addition of a random noise to find different (and possible better) local minimums and to discriminate the flat regions of the error function. In this way, the relevance weights self-adapt over time so as to improve the accuracy of the neural network automatically.

In a completely independent way, the process passes from block 462 to block 464 whenever a (verification) event occurs triggering the verification of the changes. In response thereto, the anomaly detector retrieves information about the changes being detected after a previous verification thereof (from the corresponding repository), such as for each of them the change category and the identifier of the data server. The anomaly detector at block 466 verifies these changes against the system topology (from the corresponding repository), for example, according to one or more verification rules. The flow of activity branches at block 468 according to a result of this verification. If one or more (non-compliant) changes are not compliant with the system topology, the anomaly detector at block 470 detects corresponding anomalies. For example, this happens when a key operative parameter has been changed only in part of a group of data servers contributing to provide a certain service; a typical scenario is when the data servers are nodes of a cluster (like of WAS type) that act as a single logical entity (providing a service in response to corresponding requests submitted thereto, which requests are automatically distributed among the data servers of the cluster all performing the same tasks). In this case, the anomaly detector outputs a corresponding error message (such as by displaying it onto the monitor of the control server); for example, the error message indicates each non-compliant change together with an explanation of its non-compliance with the system topology. In this way, the operator may intervene promptly to correct the anomalies. The process then returns to the block 462 from the block 470 or directly from the block 468 (if no anomalies are detected) waiting for a next verification event.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling backups of objects in an information technology system. However, the objects may be in any number and of any type (for example, partial, different or additional objects with respect to the ones mentioned above), and they may be provided in any information computing system (for example, with a distributed architecture, with a stand-alone architecture, stored in any number and type of physical/virtual computing machines and so on).

In an embodiment, the method comprises the following steps under the control of a computing system. However, the computing system may be of any type (see below).

In an embodiment, the method comprises detecting (by the computing system) one or more changed objects of the objects being changed since a previous backup thereof. However, the changed objects may be detected in any way (for example, by registering for corresponding notifications, by polling the objects and so on); in any case, the changed objects may be detected centrally (by receiving an indication thereof from computing machines wherein the objects are stored) or locally (directly on each of them).

In an embodiment, the method comprises determining (by the computing system) corresponding changes of the changed objects. However, the changes may be of any type (for example, relating to content, metadata, permissions and so on) and they may be determined in any way (for example, with partial, different or additional local tracking services with respect to the ones mentioned above, with centralized tracking services, such as GIT, and so on); in any case, the changes may be determined centrally (by receiving an indication thereof from the computing machines wherein the objects are stored) or locally (directly on each of them).

In an embodiment, the method comprises determining (by the computing system) corresponding change categories of the changes. However, the change categories may be in any number and of any type (for example, partial, different or additional change categories with respect to the ones mentioned above) and they may be determined in any way (for example, defined directly by the tracking services that have determined the corresponding changes, by discriminating different change categories for a same tracking service according to corresponding rules, such as global parameters and local parameters of a configuration file, values and schemas of a database, and so on); in any case, the change categories may be determined centrally (by receiving an indication thereof from the computing machines wherein the objects are stored) or locally (directly on each of them).

In an embodiment, the method comprises calculating (by the computing system) corresponding trigger indicators of the changed objects. However, the trigger indicators may be of any type (for example, indexes that may take discrete/continuous values within any range, logic values and so on) and they may be calculated in any way (for example, with machine learning techniques, algorithms, and so on).

In an embodiment, each trigger indicator is calculated according to the change categories of the changes of the changed object and to relevance weights of the change categories. However, the trigger indicator may be calculated in any way according to the change categories and the relevance weights (for example, based on any linear/non-linear function, such as a weighted sum, a logarithmic/exponential combination, only according to the change categories or further according to partial, different or additional other trigger parameters with respect to the ones mentioned above, and so on).

In an embodiment, the relevance weights are indicative of a relevance of the corresponding change categories. However, the relevance weights may indicate the relevance of the change categories for any purpose (for example, for the information technology system, it users, its organization and so on) and in any way (for example, increasing/decreasing with their value according to any linear/non-linear law, on an on-off basis and so on).

In an embodiment, the method comprises selecting (by the computing system) one or more critical objects of the changed objects according to the trigger indicators thereof. However, the critical objects may be selected in any way (for example, by comparing the trigger indicators with any static/dynamic threshold, directly by the logic value of the trigger indicators, according to a trend of the values of each trigger indicator over time and so on).

In an embodiment, the method comprises triggering (by the computing system) corresponding backups of the critical objects. However, the backups of the critical objects may be triggered in any way (for example, by causing their running on other computing machines wherein the critical objects are stored or by running them directly on the same computing machine, for each critical objects or for groups thereof stored on same computing machines, and so on).

Further embodiments provide additional advantageous features, which may however be omitted at all in a basic implementation.

Particularly, in an embodiment the method comprises receiving (by the computing system) corresponding feedback indicators of the backups being indicative of a utility thereof. However, the feedback indicators may be of any type (for example, either the same or different with respect to the trigger indicators) and they may be received in any way (for example, entered locally, transmitted from the computing machines wherein the backups have been run and so on).

In an embodiment, the method comprises updating (by the computing system) the relevance weights according to the feedback indicators. However, the relevance weights may be updated in any way (for example, with machine learning techniques, with adaptive algorithms and so on) and at any time (for example, after every backup, after a pre-defined number of backups, periodically and so on).

In an embodiment, the method comprises updating (by the computing system) the relevance weights according to the feedback indicators with machine learning techniques. However, the machine learning techniques may be of any type (for example, based on any neural network, such as of linear regression, convolutional and similar type, trained in any way, such as based on the Stochastic Gradient Descent, the Real-Time Recurrent Learning and similar algorithms, and so on).

In an embodiment, the method comprises determining (by the computing system) possible one or more impacted objects of the objects being impacted by the change of each of the critical objects. However, the impacted objects may be in any number (down to none) and of any type (for example, only impacted directly by the changed objects, impacted indirectly at any level or at most within a maximum level and so on). The impacted objects may be determined in any way; for example, it is possible to determine the objects being impacted by each critical object, to determine the objects being impacted by each changed object and then to calculate the trigger indicators thereof for selecting the critical objects among all of them.

In an embodiment, the impacted objects are determined according to object correlations among the objects. However, the objects correlations may be of any type (for example, clusters, dependencies, pre-requisites, interactions and so on).

In an embodiment, the method comprises triggering (by the computing system) corresponding backups of the impacted objects of each of the critical objects. However, the backup of the impacted objects may be triggered in any way (either the same or different with respect to the critical objects).

In an embodiment, the information technology system comprises a plurality of computing machines each storing one or more of the objects. However, the computing machines may be in any number and of any type, each storing any number of objects (for example, physical/virtual machines, communicating over any local, wide area, global, cellular or satellite network by exploiting any type of wired and/or wireless connections, and so on).

In an embodiment, the method comprises causing (by the computing system) the backups of the critical objects and of the corresponding impacted objects on corresponding ones of the computing machines. However, this result may be achieved in any way (for example, via remote commands, messages and so on).

In an embodiment, the method comprises detecting (by the computing system) one or more anomalies according to a comparison of the changes and the object correlations. However, the anomalies may be detected in any way (for example, with compliancy rules, artificial intelligence techniques and so on).

In an embodiment, the method comprises outputting (by the computing system) an indication of the anomalies. However, the indication of the anomalies may be output in any way (for example, by displaying, printing, notifying remotely and so on).

In an embodiment, the method comprises calculating (by the computing system) the trigger indicator of each of the changed objects further according to a time elapsed from a previous one of the backups of the changed object. However, the trigger indicator may be calculated in any way according to the elapsed time (for example, according to any corresponding relevance weight, either the same or different with respect to above, according to its value or to pre-defined ranges thereof, and so on), down to none.

In an embodiment, the method comprises calculating (by the computing system) the trigger indicator of each of the changed objects further according to corresponding subjects having performed the changes of the changed object. However, the trigger indicator may be calculated in any way according to the subjects (for example, according to any corresponding relevance weights, either the same or different with respect to above, for the subjects individually or for roles thereof, and so on), down to none.

In an embodiment, the method comprises calculating (by the computing system) the trigger indicator of each of the changed objects further according to an object type of the changed object. However, the trigger indicator may be calculated in any way according to the object type (for example, according to any corresponding relevance weight, either the same or different with respect to above, with the object types defined in any way, such as by file extensions, logic functions and so on), down to none.

In an embodiment, the method comprises determining (by the computing system) corresponding change frequencies of the changes of the changed objects. However, the change frequencies may be determined in any way (for example, over any number of previous backups, where the backups are triggered and/or run, locally or notified remotely, and so on).

In an embodiment, the method comprises calculating (by the computing system) the trigger indicator of each of the changed objects further according to the change frequency of the changed object. However, the trigger indicator may be calculated in any way according to the change frequency (for example, according to any corresponding relevance weight, either the same or different with respect to above, according to its value or to pre-defined ranges thereof, and so on), down to none.

In an embodiment, the method comprises triggering (by the computing system) a backup of the objects in response to a maximum delay from a previous one of the backups. However, the maximum delay may have any value (either individually or globally) and it may be used to trigger this indiscriminate backup of the objects in any way (for example, for each object with respect to its previous backup, for all the objects of every computing machine with respect to a previous backup of any of them, for all the objects of the information technology system with respect to a previous backup of any of them and so on).

In an embodiment, the method comprises running (by the computing system) each of the backups in response to the triggering thereof. However, the backups may be run in any way (for example, by copying the corresponding objects to local/remote disks, tapes and the like, by computing machines the same as or different from the one triggering them, and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, which comprises a computer readable storage medium that has program instructions embodied therewith; the program instructions are executable by a computing system to cause the computing system to perform the same method. However, the computer program may be implemented as a stand-alone module, as a plug-in for a pre-existing software program (for example, a backup application) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of the above-described method. An embodiment provides a system comprising a circuit (i.e., any hardware suitably configured, for example, by software) for performing each step of the above-described method. However, the system may be of any type (for example, a control computing machine controlling one or more data computing machines wherein the objects are stored, each of the data computing machines, a combination of the control computing machine and the data computing machines, and so on).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
detecting one or more changed objects of a set of objects, the one or more changed objects being changed since a previous backup of the set of objects in a computing system;
determining corresponding changes of the one or more changed objects;
determining a set of change categories defining the corresponding changes;
calculating trigger indicators for the one or more changed objects, the trigger indicators being calculated according to assigned relevance weights of change categories associated with the one or more changed objects, the assigned relevance weights being indicative of a relevance of the set of change categories to the computing system;

selecting one or more critical objects of the one or more changed objects according to their respective values of trigger indicators;
triggering corresponding backups of the one or more critical objects;
receiving corresponding feedback indicators of the backups being indicative of a utility thereof; and
updating the relevance weights according to the feedback indicators.

2. The method of claim 1 further comprising:
determining one or more candidate objects of the set of objects being impacted by changes made to the one or more critical objects according to object correlations among the set of objects, and
triggering additional backups of the one or more candidate objects.

3. The method of claim 2 further comprising:
detecting one or more anomalies according to a comparison of the corresponding changes and the object correlations among the set of objects, and
outputting an indication of the one or more anomalies.

4. The method of claim 1 wherein the calculating of the trigger indicators is further performed according to a time elapsed since the previous backup of the set of objects.

5. The method of claim 1 wherein the calculating of the trigger indicators is further performed according to corresponding subjects having performed the corresponding changes of the one or more changed objects.

6. The method of claim 1 wherein the calculating of the trigger indicators is further performed according to an object type of the one or more changed objects.

7. The method of claim 1 further comprising:
determining corresponding change frequencies of corresponding changes of the one or more changed objects,
wherein calculating of the trigger indicators is further performed according to a first change frequency corresponding to a first changed object.

8. The method of claim 1 wherein the triggering of the corresponding backups is performed in response to a maximum delay from the previous backup.

9. A computer program product comprising:
a machine readable storage device; and
computer code stored on the machine readable storage device, with the computer code including instructions and data for causing a processor(s) set to perform operations including the following:
detecting one or more changed objects of a set of objects, the one or more changed objects being changed since a previous backup of the set of objects in a computing system,
determining corresponding changes of the one or more changed objects,
determining a set of change categories defining the corresponding changes,
calculating trigger indicators for the one or more changed objects, the trigger indicators being calculated according to assigned relevance weights of change categories associated with the one or more changed objects, the assigned relevance weights being indicative of a relevance of the set of change categories to the computing system,
selecting one or more critical objects of the one or more changed objects according to their respective values of trigger indicators,
triggering corresponding backups of the one or more critical objects,
receiving corresponding feedback indicators of the backups being indicative of a utility thereof, and
updating the relevance weights according to the feedback indicators.

10. The computer program product of claim 9 further comprising:
determining one or more candidate objects of the set of objects being impacted by changes made to the one or more critical objects according to object correlations among the set of objects, and
triggering additional backups of the one or more candidate objects.

11. The computer program product of claim 9 wherein the calculating of the trigger indicators is further performed according to a time elapsed since the previous backup of the set of objects.

12. The computer program product of claim 9 further comprising:
determining corresponding change frequencies of corresponding changes of the one or more changed objects,
wherein calculating of the trigger indicators is further performed according to a first change frequency corresponding to a first changed object.

13. The computer program product of claim 9 wherein the triggering of the corresponding backups is performed in response to a maximum delay from the previous backup.

14. The computer program product of claim 9 wherein the calculating of the trigger indicators is further performed according to an object type of the one or more changed objects.

15. A system for controlling backups of objects in an information technology system, the system comprising:
a processor(s) set;
a machine-readable storage device; and
computer code stored on the machine readable storage device, with the computer code including instructions and data for causing the processor(s) set to perform operations including the following:
detecting one or more changed objects of a set of objects, the one or more changed objects being changed since a previous backup of the set of objects in a computing system,
determining corresponding changes of the one or more changed objects,
determining a set of change categories defining the corresponding changes,
calculating corresponding trigger indicators for the one or more changed objects, the trigger indicators being calculated according to assigned relevance weights of change categories associated with the one or more changed objects, the assigned relevance weights being indicative of a relevance of the set of change categories to the computing system,
selecting one or more critical objects of the one or more changed objects according to their respective values of trigger indicators,
triggering corresponding backups of the one or more critical objects,
receiving corresponding feedback indicators of the backups being indicative of a utility thereof, and
updating the relevance weights according to the feedback indicators.

16. The system of claim 15 further comprising:
determining one or more candidate objects of the set of objects being impacted by changes made to the one or more critical objects according to object correlations among the set of objects, and triggering additional backups of the one or more candidate objects.

17. The system of claim 15 wherein the calculating of the trigger indicators is further performed according to a time elapsed since the previous backup of the set of objects.

18. The system of claim 15 wherein the calculating of the trigger indicators is further performed according to an object type of the one or more changed objects.

19. The system of claim 15 further comprising:
determining corresponding change frequencies of corresponding changes of the one or more changed objects,
wherein calculating of the trigger indicators is further performed according to a first change frequency corresponding to a first changed object.

20. The system of claim 15 wherein the triggering of the corresponding backups is performed in response to a maximum delay from the previous backup.

\* \* \* \* \*